United States Patent [19]

Faber et al.

[11] 4,358,801
[45] Nov. 9, 1982

[54] DISK UNIT WITH ROTATABLE CIRCULAR INFORMATION DISK

[75] Inventors: Johannes W. Faber, Eindhoven; Pieter van der Giessen, The Hague, both of Netherlands

[73] Assignee: U.S. Philips Corporation, New York, N.Y.

[21] Appl. No.: 207,509

[22] Filed: Nov. 17, 1980

[30] Foreign Application Priority Data

Jul. 31, 1980 [NL] Netherlands ................. 8004378

[51] Int. Cl.³ ............................................. G11B 23/04
[52] U.S. Cl. ...................................... 360/97; 360/133; 206/444
[58] Field of Search ........................... 360/97-99, 360/133, 135, 86; 206/444; 346/137

[56] References Cited

U.S. PATENT DOCUMENTS

| | | | |
|---|---|---|---|
| 3,812,534 | 5/1974 | Rousseau et al. | 360/98 |
| 3,932,895 | 1/1976 | Ward | 360/97 X |
| 4,118,748 | 10/1978 | Doering et al. | 360/135 X |
| 4,131,199 | 12/1978 | Hatchett et al. | 360/133 X |

*Primary Examiner*—John H. Wolff
*Attorney, Agent, or Firm*—Thomas A. Briody; Robert T. Mayer; Algy Tamoshunas

[57] ABSTRACT

A disk unit (1) comprises a circular information disk (2) accommodated in an enclosure, at least one major wall (6) of the enclosure being formed with a slot (11) for an information write and/or read head of a disk drive apparatus, which slot is closed by means of a sliding plate (12) of a slot sealing device when the disk unit is disposed outside the drive unit, and which slot can be opened by sliding the sliding plate from the closed position to the open position when the disk unit is inserted into a drive unit. An actuating member for moving the sliding plate is constituted by a lever (13) which is journalled on the major wall (6) in which the slot (11) is formed, in such a way that a transmission ratio greater than unity is obtained between a free end (15) of the lever which is externally accessible to the drive unit and a second free end (16) which is connected to sliding plate (12).

7 Claims, 4 Drawing Figures

DISK UNIT WITH ROTATABLE CIRCULAR INFORMATION DISK

The invention relates to a disk unit comprising a circular information disk, which is rotatable about an axis of rotation, an enclosure for the information disk having parallel major walls on both sides of the information disk and having side walls, at least one of the two major walls having a slot for an information write and/or read head associated with a disk-drive apparatus, which slot extends at least substantially radially relative to the axis of rotation of the information disk; a slot sealing device, comprising a sliding plate, which is at least substantially translatable relative to the enclosure between an open position and a closed position, and an actuating member, which is externally accessible to a disk drive apparatus, is coupled to the sliding plate, and is movable between a rest position and an operating position, in order to move the sliding plate from the closed position to the open position when the actuating member is moved from the rest position to the operating position by a disk drive unit; as well as resilient means for moving back the sliding plate from the open position to the closed position and for moving back the actuating member from its operating position to its rest position.

Such a disk unit is for example known from U.S. Pat. No. 3,529,301. In this known disk unit the information disk is accommodated in a flat enclosure of square circumference. The slot sealing device comprises a sliding plate which is secured to a sliding rod which is movable along one of the walls of the enclosure. In the space between the round information disk and a corner of the square enclosure there is arranged a tension spring, which resiliently loads the slot sealing device in such a way that the sliding plate is pulled towards the closed position by the tension spring. An associated drive apparatus comprises a push pin, which via an opening in the side wall of the enclosure can penetrate into said space between the information disk and the corner of the enclosure in order to push the actuating member from its rest position to its operating position against the force of the tension spring. Thus, the sliding plate is moved from the closed position to the open position. Connected to the sliding rod is a clamping mechanism for retaining the information disk against stops in the enclosure. When the actuating member is moved to the operating position the clamping device is released at the same time. The disk unit can be slid into an associated disk drive apparatus, the sliding movement permitting said pin on the disk drive apparatus to enter the enclosure of the disk unit through the opening. Thus, the disk unit is especially suitable for cooperation with disk drive apparatus which are constructed so that the slot in the enclosure of the disk unit is disposed transversely of the direction in which said unit is slid into the disk drive apparatus. The said space between the information disk and the corner of the enclosure should be available for the penetration of the pin of the disk drive apparatus and for accommodating parts of the slot sealing device.

It is the object of the invention to provide a disk unit of the type mentioned in the opening paragraph which is particularly suitable for having a slot which extends in the direction in which the disk unit can be slid into a disk drive apparatus. Furthermore, the invention is suitable for disk units with an enclosure of square circumference but in which the space between the information disk and the corners of the enclosure cannot accommodate parts of the slot sealing device. Such a disk unit is for example described in the Applicant's previously filed Patent Application No. 8000381 correspond to U.S. application Ser. No. 146,902 filed May 5, 1980 (herewith incorporated by reference), the enclosure of said unit comprising two covers which are axially movable relative to each other, which covers can be interconnected near the corners or are permanently interconnected near the corners. The invention is characterized in that: the actuating member comprises a lever which is pivotable relative to the enclosure between the rest position and the operating position about a pivoting axis parallel to the axis of rotation of the information disk, which lever has a first end which functions as a stop for the drive unit and a second end which cooperates with the sliding plate; that the lever and the sliding plate are journalled on the major wall of the enclosure in which the slot is formed; and that the pivoting axis is situated nearer to the first end than to the second end of the lever. In disk units in accordance with the invention the slot can be opened by a small displacement of the disk unit relative to the disk drive apparatus, whilst a very flat construction of the slot sealing device is possible.

In the slot sealing device of a disk unit in accordance with the invention the pivotal movement of the level should be converted into a substantially translational movement of the sliding plate. In order to prevent problems owing to jamming or slanting of the sliding plate, which may have a great length in comparison to its width, an embodiment of the invention is of interest which is characterized in that: the sliding plate and the second end of the lever are pivotably connected to each other; that the sliding plate and the closure are provided with stop means which cooperate with each other and which determine the position of the sliding plate in the closed position relative to the enclosure under the influence of a load exerted by the resilient means; and that between the closed position and the open position the sliding plate is pivotable relative to the lever to a limited extent and unimpeded by the enclosure. This embodiment is based on the recognition that the orientation of the sliding plate is of importance especially in the closed position. During the movement between the closed position and the open position the orientation of the sliding plate is of less significance, whilst in principle this may also be the case for the orientation in the open position.

In order to obtain a flat and dust-tight slot sealing device an embodiment of the invention is of interest which is characterized in that: the slot sealing device comprises a retaining plate, which is secured to a major wall of the enclosure, which extends parallel to said wall, and which retains the sliding plate, the lever and the resilient means between itself and said major wall; that the lever has a flat shape with a thickness dimension which is a few times smaller than its width dimension, the lever being arranged so that its width dimension extends parallel to the retaining plate; and that a side wall of the enclosure is formed with a slot-shaped opening, situated between the major wall of the enclosure and the retaining plate, for the external actuation of the lever by a drive unit. The lever may project through the slot-shaped opening in the side wall of the enclosure both in the operating position and in the rest position, so that excellent dust-tight sealing of said opening is constantly assured.

In order to minimize the required travel of the lever and the required translation of the sliding plate an embodiment is of importance which is characterized in that the slot sealing device comprises two sliding plates which are movable in opposite directions and which each close substantially one half of the slot in the major wall of the enclosure, as well as two levers, which each cooperate with one of the two sliding plates, and that the two sliding plates partly overlap each other in the closed position. Now each of the sliding plates need only perform a sliding movement which is slightly greater than half the width of the slot in the major wall of the enclosure. The overlapping construction provides a satisfactory dust-tight sealing.

When using the disk unit in a disk drive apparatus it may be of importance to ensure that also if the disk unit is not entirely or not correctly placed in position or in event of any defect whatsoever, the information disk cannot be approached by an information write and/or read head adapted to cooperate with said disk if it is uncertain that the slot is actually fully open. It is therefore of interest to use an embodiment of the invention which is characterized in that the disk unit is provided with at least one detection window in a major wall of the enclosure for an optical detection of the position of the sliding plate of the slot sealing device, the open position and the closed position of the sliding plate differing from each other in an optically detectable manner in that parts of the slot-sealing device are situated in front of the detection window solely in one of said two positions.

The invention will now be described in more detail with reference to the drawing, which relates to an embodiment of the invention and in which.

Figure 1:
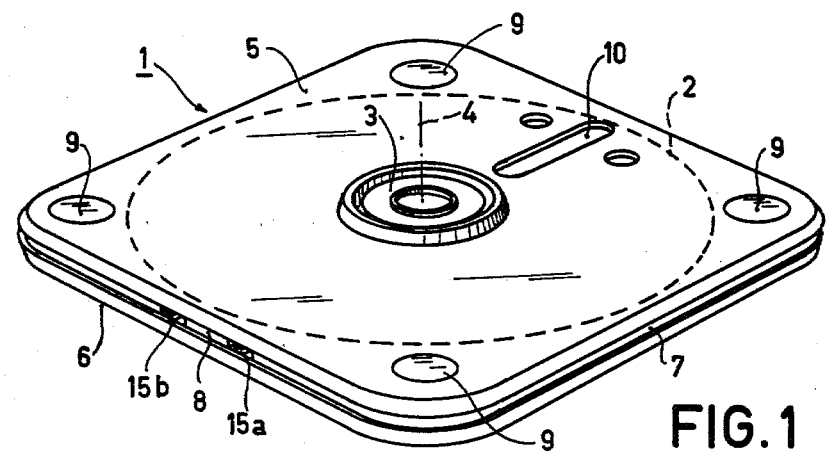
FIG. 1 is a perspective view of a disk unit in accordance with the invention.
Figure 2:
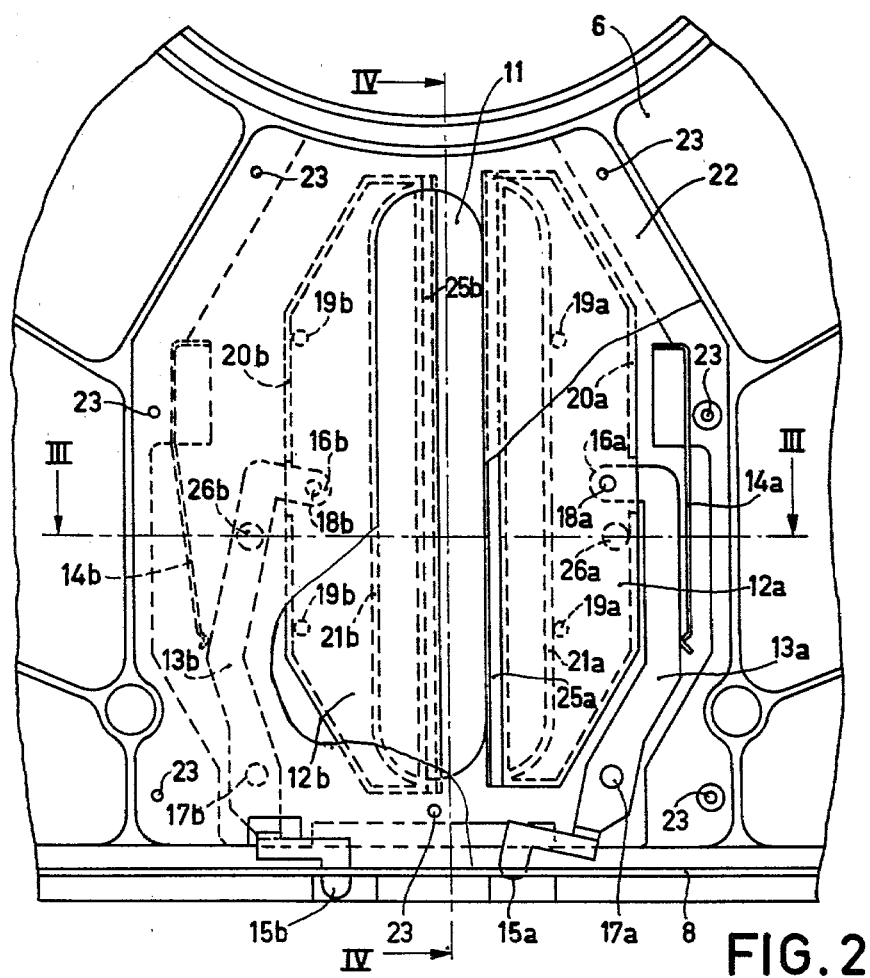
FIG. 2 is an elevation, on an enlarged scale, of a slot sealing device in the bottom wall of the disk unit in accordance with FIG. 1.

The disk unit 1 is largely identical to a disk unit as described previously in the said Patent Application No. 80 00381 (PHN.9671). This concerns a disk unit with only one optical disk 2 of a type as described previously in United States Patent Specification U.S. Pat. No. 4,074,282 (herewith incorporated by reference). In the center of the optical disk a centering device 3 is located of a type as described previously in the Applicant's Patent Application No. 79 08859 corresponding to U.S. application Ser. No. 231,649, filed Feb. 5, 1981 (herewith incorporated by reference). The optical disk 2 is rotatable about an axis of rotation 4. The disk unit comprises an enclosure with parallel major walls 5 and 6 parallel to the optical disk 2. The major wall 5 together with a continuous side wall 7 constitutes an upper cover of the enclosure, while the major wall 6 is formed with an upright side wall 8, with which it constitutes a lower cover. The two covers are movable relative to each other over a limited distance in the axial direction, i.e. in the direction of the axis of rotation 4, but are constantly interconnected by means of four connecting devices 9 near the four corners of the enclosure. By means of these connecting devices the two major walls 5 and 6 are constantly resiliently urged towards each other. The construction of the connecting devices is irrelevant for the present Patent Application; for a possible version reference is made again to the said Patent Application No. 80 00381 corresponding to U.S. application Ser. No. 146,902 filed May 5, 1980. The major wall 5 has a slot 10, which extends at least substantially radially relative to the axis of rotation 4 of the information disk 2, for an information write and/or read head, not shown, which belongs to a disk drive apparatus and which is of no further significance for the present invention. The lower major wall 6 is also formed with a slot. This slot extends in a diametrically opposite direction relative to the slot 10, that is at the front and bottom in FIG. 1. In FIG. 2 this slot is designated by the reference numeral 11.

Each of the slots 10 and 11 can be sealed by means of a slot sealing device. In the following description only the slot sealing device for sealing the slot 11 will be described, the sealing device for the slot 10 being identical.

In the following part of the description, when a slot sealing device comprises two corresponding parts, a distinction will be made between these parts, where necessary, by the addition of an A or a B to the reference numeral.

Figure 3:
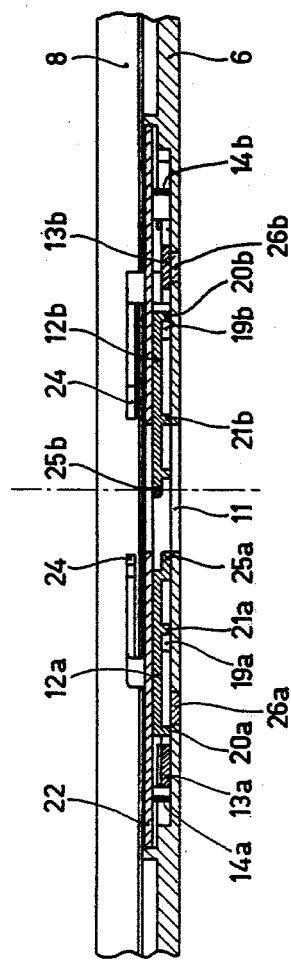
FIG. 3 is a sectional view taken on the arrows III—III in FIG. 2.
Figure 4:
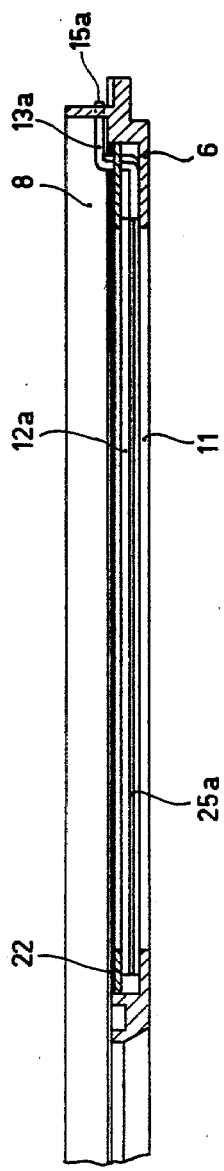
FIG. 4 is a sectional view taken on the arrows IV—IV of FIG. 2.

The slot sealing device, see FIGS. 2 to 4, comprises two sliding plates 12, which are at least substantially translatable relative to the enclosure between an open position and a closed position. For the sake of clarity the sliding plate 12A is shown in the open position and the sliding plate 12B in the closed position. Two actuating members 13, which are externally accessible to a disk drive apparatus and which are movable between a rest position and an operating position, are coupled to the sliding plates 12. The actuating members are intended for moving the sliding plates from the closed position to the open position. The actuating member 13A is shown in the operating position and the actuating member 13B in the rest position, in conformity with the fact that the sliding plate 12A is in the open position and the sliding plate 12B in the closed position. Resilient means in the form of leaf springs 14 secured to the major wall 6 are provided for returning the sliding plates from their open position to the closed position and thereby simultaneously moving the actuating members back from their operating positions to their rest positions.

The actuating members 13 comprise two levers which are pivotable relative to the enclosure about pivoting axes parallel to the axis of rotation 4 of the optical disk 2. The levers 13 have a first end 15 which functions as a stop for a drive unit and a second end 16 which cooperates with the sliding plate 12. The two levers and the two sliding plates are journalled on the major wall 6 in which the slot 11 is formed. The levers are journalled by means of two pivoting pins 17, which are integral with the major wall 6. Said pins are arranged so relative to the first and the second ends of the levers that the pivoting axis of each lever is situated nearer to the first end than to the second end, so that a transmission ratio greater than unity is obtained between the two ends.

Each of the sliding plates 12 is pivotably connected to the second end 16 of the associated levers 13 by means of a pivoting pin 18. The sliding plates 12 and the enclosure 6 are provided with cooperating stop means which in the closed position of the sliding plate define its position relative to the enclosure, under the influence of the leaf springs 14. Said stops comprise pins 19 of the enclosure 6 and ridges 20, which cooperate therewith and which are formed on the sliding plates 12. In FIG. 2 the ridge 20B of the sliding plate 12B is urged against the pins 19B under the influence of the load exerted by the leaf spring 14B. The position of the sliding plate 12B in the closed position is determined by the position of the pivoting pin 18B and by the pins 19B, so that the position of the sliding plate is determined by three points. In addition the sliding plates are formed with ridges 21, which serve to define its position in the open position, see the position of sliding plate 12A. Between the closed position and the open position the sliding plates are pivotally movable to a limited extent relative to the levers 13 and relative to the major wall 6, in that the pins 19 are freely movable in the space between the ridges 20 and 21. Thus, the sliding plates can be moved substantially unimpeded from the closed position to the open position or vice versa, so that during the movement only very small frictional forces obtain and no jamming or slotting problems occur.

The slot sealing device comprises a retaining plate 22 which is arranged on the major wall 6 and which extends parallel thereto. For the sake of clarity FIG. 2 shows said plate in partly cut away condition, said plate being secured by means of pins 23 of the enclosure. By means of said retaining plate the sliding plates 12, the levers 13 and the leaf springs 14 are retained between the major wall 6 and the retaining plate 22 itself. The levers 13 have a flat shape with a thickness dimension which is several times smaller than the width dimension and the levers are arranged to extend parallel to the retaining plate 22 with their width dimension and thus parallel to the major wall 6. This also contributes to the fact that only a small space is required for the slot sealing device. The side wall 8 of the enclosure 6 is formed with slot-shaped openings 24, which are situated between the major wall 6 of the enclosure and the retaining plate 22 for the external actuation of the levers by a drive unit. The drive unit may for example be provided with a simple ridge for moving the ends 15 of the levers 13. The ridge may be coated with an elastic material in order to avoid overloading of the levers, because in their open positions the sliding plates bear against the stops 19 so that at a given instant they cannot be moved any further.

In the closed position the two sliding plates 12 partly overlap each other. For this purpose the sliding plate 12A is provided with a tab 25A and the sliding plate 12B with a tab 25B, which tabs engage with each other in the closed position of the sliding plates.

In the major wall 5 two detection windows 26 are formed, consisting of transparent plastics disks glued in holes in the major wall 6. This enables an optical detection of the positions of the sliding plates 12 of the slot sealing device, the open position and the closed position of the sliding plates differing from each other in an optically detectable manner. This is because the levers 13 associated with the slot sealing device are situated in front of the window 26 solely in the closed position of the sliding plates. By giving the levers, when they are situated in front of the window in the closed position, and the sliding plates, when these are situated in front of the windows in the open position, different light-reflecting properties a detection of the open position of the sliding plates is possible with the aid of a light source and a photoelectric cell. Detection is effected at sufficient distance from the slot 11, so that the detection means are not affected by the moving information write and/or read head. When using a reflecting optical information disk it is alternatively possible to make the sliding plates 13 and the retaining plate 22 transparent, so that the reflecting surface of the optical disk can be used for the detection of the open position of the sliding plates.

What is claimed is:

1. A disk unit (1), comprising:
    an information disk (2) which is rotatable about an axis of rotation (4),
    an enclosure for the information disk (2) having parallel major walls (5; 6) on both sides of the information disk and having side walls (7; 8), at least one of the two major walls (5; 6) having a slot (10) for an information write and/or read head associated with a disk drive apparatus, which slot extends at least substantially radially relative to the axis of rotation (4) of the information disk (2);
    a slot sealing device, comprising at least one sliding plate (12a, 12b), which is at least substantially translatable relative to the enclosure between an open position and a closed position, and at least one actuating member (13a, 13b), which is externally accessible to a disk drive apparatus, is coupled to the sliding plate (12a, 12b), and is movable between a rest position and an operating position in order to move the sliding plate from the closed position to the open position when the actuating member is moved from the rest position to the operating position by a disk drive unit, and
    at least one resilient means (14a, 14b) for moving back the sliding plate from the open position to the closed position and for moving back the actuating member, from its operating position to its rest position,
    the actuating member comprising at least one lever (13) having first end (15) and a second end (16), the lever being pivotable relative to the enclosure between the rest position and the operating position about a pivoting axis which is parallel to the axis of rotation (4) of the information disk (2) and which is situated nearer to the first end (15) than to the second end (16) of the lever, the first end (15) functioning as a stop for the drive unit and the second end (16) being pivotally connected to the sliding plate (12) so that between the closed position and the open position the sliding plate (12) is pivotable relative to the lever (13) to a limited extent and unimpeded by the enclosure (6), and
    the lever (13) and the sliding plate (12) being journalled on the major wall (6) of the enclosure in which the slot (11) is formed.

2. A disk unit as claimed in claim 1 wherein
    the slot sealing device comprises a retaining plate (22), which is secured to a major wall (6) of the enclosure, which extends parallel to said wall, and which retains the sliding plate (12), the lever (13) and the resilient means (14) between itself and said major wall (6),
    the lever (13) has a flat shape with a thickness dimension which is appreciably smaller than its width dimension, the lever being arranged so that its width dimension extends parallel to the retaining plate, and
    that a side wall (8) of the enclosure is formed with a slot-shaped opening (24), situated between tthe major wall (6) of the enclosure and the retaining plate (22), for the external actuation of the lever by a drive unit.

3. A disk unit as claimed in claim 1 wherein
   the slot sealing device comprises two sliding plates (12) which are movable in opposite directions and which each close substantially one half of the slot (11) in the major wall (6) of the enclosure, as well as two levers (13) which each cooperate with one of the two sliding plates, and
   that the two sliding plates (12) partly overlap each other in the closed position.

4. A disk unit as claimed in claim 1 including at least one detection window (26) in a major wall (6) of the enclosure for optical detection of the position of the sliding plate (12) of the slot sealing device, the open position and the closed position of the sliding plate differing from each other in an optically detectable manner in that parts (13) of the slot sealing device are situated in front of the detection window (26) solely in one of said two positions.

5. A disk unit (1), comprising:
   an information disk (2) which is rotatable about an axis of rotation (4),
   an enclosure for the information disk (2) having parallel major walls (5; 6) on both sides of the information disk and having side walls (7; 8), at least one of the two major walls having a slot (10) for an information write and/or read head associated with a disk drive apparatus, which slot extends at least substantially radially relative to the axis of rotation (4) of the information disk,
   a slot sealing device comprising at least one sliding plate (12a, 12b), which is at least substantially translatable relative to the enclosure between an open position and a closed-position,
   at least one actuating member (13a, 13b), which is externally accessible to the disk drive apparatus, is coupled to the sliding plate, and is movable between a rest position and an operating position in order to move the sliding plate from the closed position to the open position when the actuating member is moved from the rest position to the operating position by a disk drive unit,
   at least one resilient means (14a, 14b) for moving back the sliding plate from the open position to the closed position and for moving back the actuating member, from its operating position to its rest position,
   the actuating member comprising at least one lever (13) which is pivotable relative to the enclosure between the rest position and the operating position about a pivoting axis parallel to the axis of rotation of the information disk, said lever having a first end (15) which functions as a stop for the drive unit and a second end (16) which cooperates with the sliding plate, said pivoting axis being situated nearer to the first end than to the second end of the lever, the lever and the sliding plate being journalled on the major wall of the enclosure in which the slot is formed, and said enclosure having at least one detection window (26) in a major wall thereof for optical detection of the position of the sliding plate of the slot sealing device, said window being disposed relative to the open position and the closed position of the sliding plate such that portions of the slot sealing device are situated in front of the detection window solely in one of said two positions.

6. A disk unit as claimed in claim 1 including stop means (19, 20) for determining, in cooperation with the sliding plate and the enclosure, the position of the sliding plate in the closed position relative to the enclosure under the influence of a load exerted by the resilient means.

7. A disk unit as claimed in claim 6 wherein
   the sliding plate (12) and the second end (16) of the lever (13) are pivotally connected to each other,
   the sliding plate (12) and the enclosure are provided with stop means (19, 20) which cooperate with each other and which determine the position of the sliding plate in the closed position relative to the enclosure under the influence of a load exerted by the resilient means (14), and
   between the closed position and the open position the sliding plate (12) is pivotable relative to the lever (13) to a limited extent and unimpeded by the enclosure (6).

* * * * *